Oct. 20, 1959      L. J. MALTBY      2,909,342
LANDING GEAR FOR HELICOPTERS

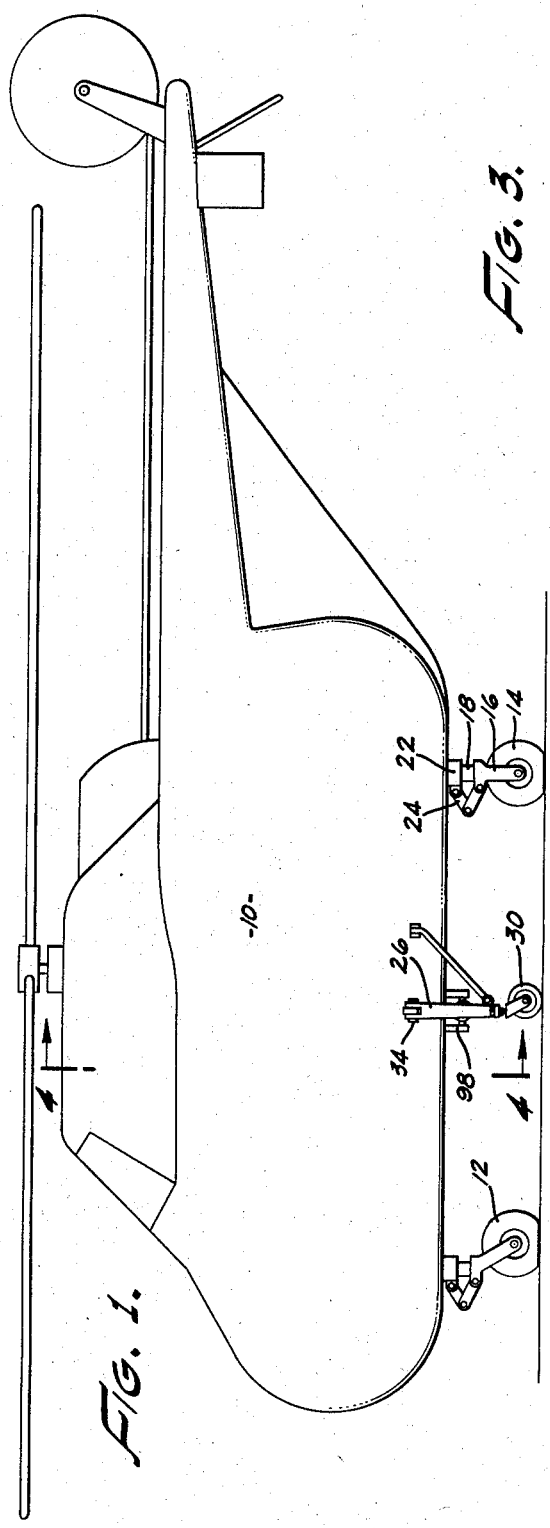
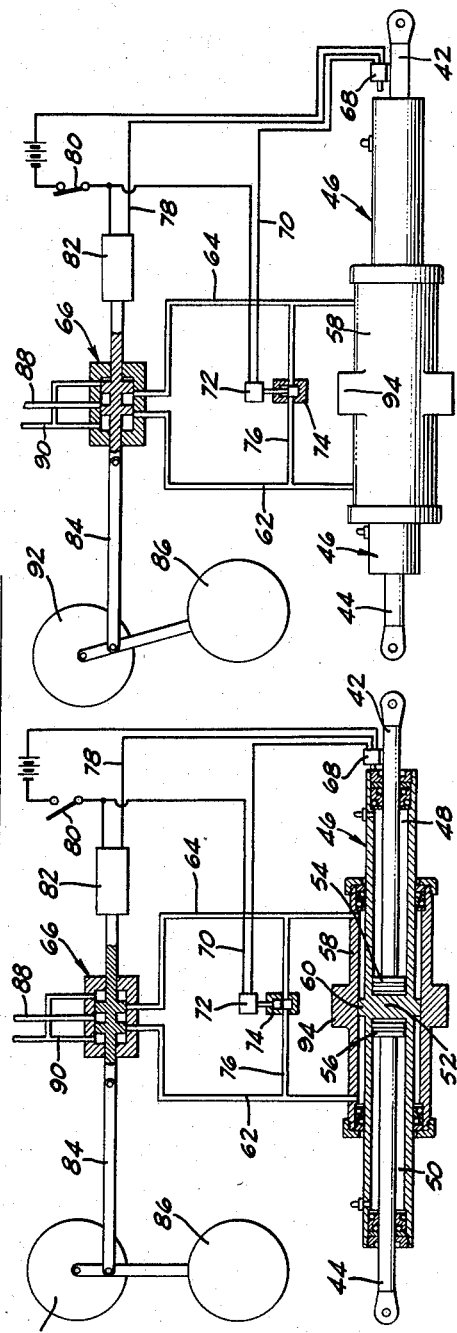

Filed June 4, 1954      2 Sheets-Sheet 2

INVENTOR.
LEWIS J. MALTBY
BY
Lyon & Lyon
ATTORNEYS

United States Patent Office 2,909,342
Patented Oct. 20, 1959

2,909,342

LANDING GEAR FOR HELICOPTERS

Lewis J. Maltby, Burbank, Calif., assignor to Menasco Manufacturing Company, Burbank, Calif., a corporation of California Application June 4, 1954, Serial No. 434,589

2 Claims. (Cl. 244—103)

This invention relates to aircraft landing gear and particularly to landing gear of aircraft which are capable of vertical ascent and descent.

The landing of a helicopter is greatly limited by the roughness or inclination of the terrain or hillside and frequently it is impossible to land the aircraft. Consequently, the usual practice is to hover the aircraft with one wheel engaging the ground. This type of practice is dangerous and requires skillful piloting technique and nearly ideal wind conditions.

It is an object of this invention to provide a landing gear which will permit a helicopter to land on a hillside or a rough terrain.

It is a further object of this invention to provide a helicopter landing gear which automatically positions the wheels to support the aircraft in a vertical position upon engagement of the wheels with the ground.

Other objects and advantages will be readily apparent from the following description.

In the drawings:

Figure 1 is a side elevation of a helicopter embodying this invention.

Figure 2 is a diagrammatic view of the hydraulic control system when the helicopter is in flight.

Figure 3 is a view similar to Figure 2 with the landing gear in contact with the ground.

Figure 7:
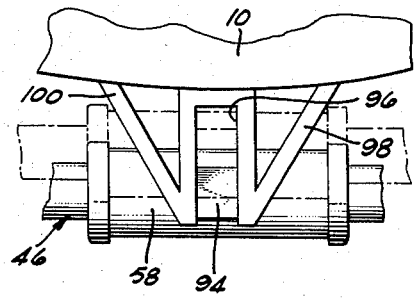
Figure 7 is a fragmentary view illustrating the landing gear guide means.

The helicopter has a fuselage 10 provided with a nose wheel 12 and a main wheel 14, both mounted along the center line of the fuselage. Both wheels 12 and 14 are identically mounted for example wheel 14 is mounted in fork 16, which is secured to piston 18, which in turn enters shock absorber 22, which is of any conventional type. Torque arms 24 are provided to prevent swivel of the fork 16 relative to the shock absorber 22.

Also provided are the outriggers 26 and 28, which carry caster wheels 30 and 32 respectively. These outrigger gears provide the lateral support for the fuselage.

The outriggers are in the form of bell cranks and are pivotally mounted upon the fuselage 10 at 34 and 36 respectively, and have the free extremities 38 and 40 pivotally secured to piston rods 42 and 44 respectively. The piston rods enter opposite sides of cylinder 46 which is divided into separate chambers 48 and 50 by wall 52. When the wheels engage the ground the outriggers tend to pivot exerting an outward pull on the piston rods. The piston heads 54 and 56 compress the air in the respective chambers thus functioning as shock absorbers. The cylinder 46 in turn is mounted within an outer cylinder 58 and carries a piston head 60 thereon. Fluid under pressure from the helicopter's hydraulic system is delivered to either side of piston head 60 through conduits 62 and 64 to position fuselage 10 in an upright position.

Figure 6:
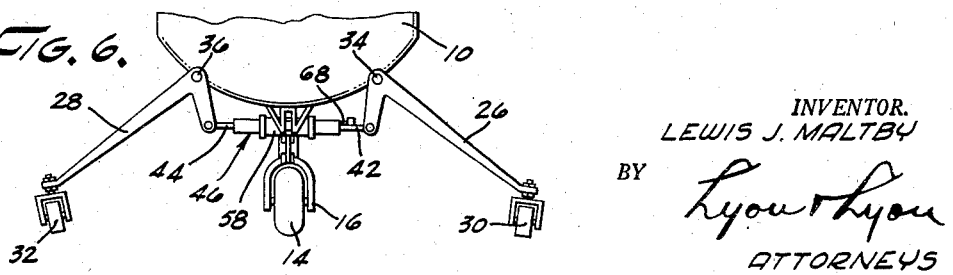
Figure 6 is a fragmentary view similar to Figure 4 of the landing gear with the helicopter in flight.

The flow of fluid through either conduit 62 or 64 is controlled by the valve 66 which is sensitive to the vertical position of the fuselage. During flight the wheels 30 and 32 are fully lowered as seen in Figure 6, the piston rods 42 and 44 being fully within chambers 48 and 50. The piston rod 42 carries a switch contact 68 which when the wheel 30 is at its lowermost position closes two switches. The first of which completes circuit 70 energizing solenoid 72 opening valve 74 communicating conduits 62 and 64 through by-pass conduit 76 by passing actuating piston 60. The second switch closes circuit 78 when pilot switch 80 is closed energizing solenoid valve lock 82 to lock valve stem 84 of valve 66 in place.

Figure 5:
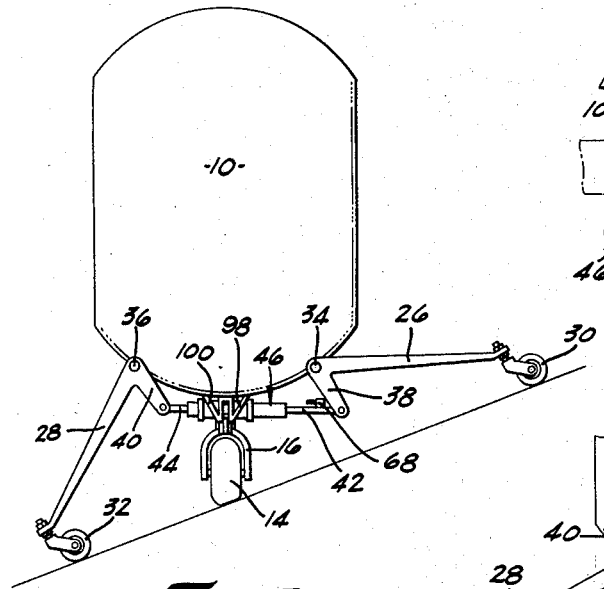
Figure 5 is a view similar to Figure 4 with the helicopter landed on a hillside.
Figure 4:
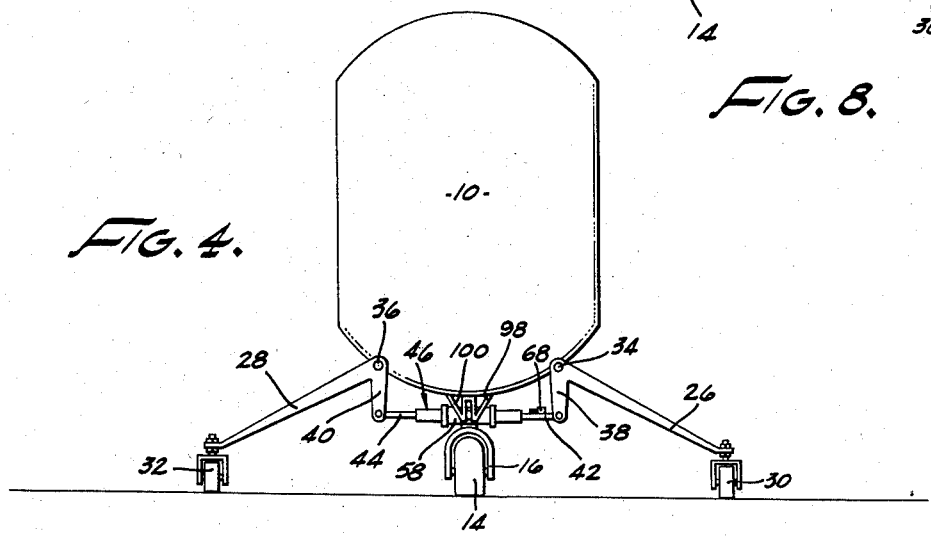
Figure 4 is a frontal elevation taken along line 4—4 of Figure 1.

When wheel 30 engages the ground whether level as in Figure 4 or a hillside as in Figure 5, the contact 68 is removed and circuits 70 and 78 opened. The valve 74 closes blocking by-pass 76 and the lock 82 is deenergized releasing valve stem 84.

The valve stem is then positioned by pendulum 86 which, of course, seeks a vertical position. As seen in Figure 3, assuming the landing gear is on a hillside with wheel 30 higher than wheel 32 and the aircraft tilted to the right, the valve 66 is positioned by the pendulum so that fluid under pressure from the helicopter's hydraulic system is delivered through supply line 88 through conduit 64 to the right side of piston 60, moving cylinder 46 to the left away from the position shown in Figure 3, positioning the aircraft in the vertical position at which time valve 66 will close conduits 62 and 64. Fluid in cylinder 58 to the right of piston 60 passes out conduit 62 to the return line 90 of the hydraulic system. Similarly, if the aircraft is tilted to the left, fluid under pressure is supplied by valve 66 to conduit 62 positioning the aircraft in a vertical position. A damper 92 eliminates oscillation or hunting of the pendulum 86 and hence valve stem 84.

As the outriggers 26 and 28 pivot the actuator and shock absorber means inside cylinder 58 move relative to the fuselage. To guide this movement, the cylinder 58 has thereon a lug 94 which fits into a groove 96 formed between brackets 98 and 100.

Figure 8:
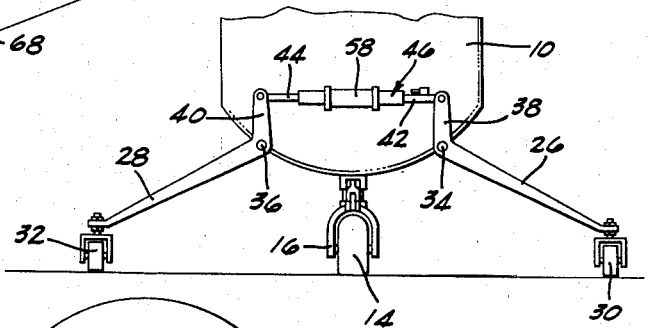
Figure 8 is a fragmentary view similar to Figure 4 of a modified form of this invention.

In Figure 8 there is illustrated a slight modification wherein the bell crank outriggers 26 and 28 are turned over and the actuator shock absorber system floats inside the fuselage 10. This actuator would also be provided with a guide similar to that shown in Figure 8.

While what hereinbefore has been described are the preferred embodiments of this invention, it is readily apparent that alterations and modifications can be resorted to without departing from the scope of this invention and such alterations and modifications are intended to be included within the scope of the appended claims.

I claim:

1. In a vertically ascending and descending aircraft, the combination of: main load supporting wheels mounted upon said aircraft, a pair of lateral support wheels, outrigger means rotatably and pivotally supporting one of said lateral support wheels on each side of said aircraft, a cylinder divided into two chambers, a piston in each chamber being secured to one of said outriggers forming a shock absorber for each lateral support wheel, and actuating means moving said cylinder in response to vertical position of said aircraft to maintain said aircraft upright.

2. In a vertically ascending and descending aircraft, the combination of: main load supporting wheels mounted upon said aircraft, a pair of lateral support wheels, outrigger means rotatably and pivotally supporting one of said lateral support wheels on each side of said aircraft, a cylinder divided into two chambers, a piston in each chamber being secured to one of said outriggers forming a shock absorber for each lateral support wheel, a piston head on said cylinder, means for applying fluid pressure on said piston head to move said cylinder relative to said aircraft, and means responsive to vertical position of said aircraft controlling application of fluid pressure on said piston head to maintain said aircraft in a vertical position.

References Cited in the file of this patent

UNITED STATES PATENTS

| | | |
|---|---|---|
| 1,685,119 | Carns | Sept. 25, 1928 |
| 1,845,797 | Kearney | Feb. 16, 1932 |
| 2,260,102 | Freret | Oct. 21, 1941 |
| 2,318,259 | Sikorsky | May 4, 1943 |
| 2,347,959 | Moore et al. | May 2, 1944 |
| 2,366,995 | Aulin | Jan. 9, 1945 |
| 2,520,266 | Adams | Aug. 29, 1950 |

FOREIGN PATENTS

| | | |
|---|---|---|
| 168,692 | Great Britain | Sept. 14, 1921 |
| 483,365 | Italy | July 24, 1953 |
| 618,914 | Great Britain | Mar. 1, 1949 |
| 818,734 | Germany | Oct. 29, 1951 |
| 819,026 | France | June 28, 1937 |